United States Patent [19]
Coop

[11] Patent Number: 5,604,969
[45] Date of Patent: Feb. 25, 1997

[54] METHOD OF MANUFACTURING HYDRAULIC ACTUATORS

[75] Inventor: Geoffrey R. Coop, Warwick, United Kingdom

[73] Assignee: Automotive Products, plc, Warwickshire, United Kingdom

[21] Appl. No.: 313,313

[22] PCT Filed: Feb. 16, 1994

[86] PCT No.: PCT/GB94/00317

§ 371 Date: Dec. 29, 1994

§ 102(e) Date: Dec. 29, 1994

[87] PCT Pub. No.: WO94/19618

PCT Pub. Date: Sep. 1, 1994

[30] Foreign Application Priority Data

Feb. 17, 1993 [GB] United Kingdom .................. 9303113
Jun. 19, 1993 [GB] United Kingdom .................. 9312730

[51] Int. Cl.⁶ .................................................. B23P 17/00
[52] U.S. Cl. ........................... 29/418; 29/527.6; 29/558; 428/582
[58] Field of Search ...................... 60/533; 29/418, 29/527.6, 558, 890.09; 164/69.1; 428/577, 582

[56] References Cited

U.S. PATENT DOCUMENTS

| | | | |
|---|---|---|---|
| 1,724,323 | 8/1929 | Stoddard | 29/418 |
| 2,309,260 | 1/1943 | Strauss | 29/418 |
| 2,323,972 | 7/1943 | Brauchler | 29/527.6 |
| 2,385,160 | 9/1945 | Phelps et al. | 29/418 |
| 2,626,453 | 1/1953 | Criley | 29/418 |
| 2,861,333 | 11/1958 | Morin et al. | 29/527.6 |
| 3,118,225 | 1/1964 | McAndrews | 29/527.6 |
| 3,411,563 | 11/1968 | Fleck | 164/69.1 |
| 3,503,123 | 3/1970 | Law | 29/558 |
| 3,599,314 | 8/1971 | Harrison | 29/418 |
| 3,613,219 | 10/1971 | Fisher | 29/418 |
| 3,889,356 | 6/1975 | Cleaver et al. | 29/558 |
| 4,263,707 | 4/1981 | Cooke | 29/509 |
| 4,288,103 | 9/1981 | Gallagher et al. | 29/558 |

FOREIGN PATENT DOCUMENTS

| | | |
|---|---|---|
| 0177061 | 4/1986 | European Pat. Off. . |
| 616042 | 1/1949 | United Kingdom ............. 29/418 |
| 2224960 | 5/1990 | United Kingdom . |

Primary Examiner—David P. Bryant
Attorney, Agent, or Firm—Paul E. Milliken; Lee A. Germain

[57] ABSTRACT

A method of manufacturing a hydraulic actuator body such as, for example, a brake wheel cylinder or a clutch or brake master cylinder. The method includes the steps of forming a basic actuator body having at least one spigot projecting externally therefrom, holding the body by gripping the spigot between co-operating jaws and machining the body while it is held by the spigot. If desired the spigot can be removed from the body when all other machining is complete.

8 Claims, 2 Drawing Sheets

METHOD OF MANUFACTURING HYDRAULIC ACTUATORS

This invention relates to a method of manufacturing hydraulic actuators such as brake and clutch master and slave cylinders.

Internal shoe drum brakes of motor vehicles are typically operated by hydraulic wheel cylinders which are mounted on a backplate. Even though a particular size wheel cylinder may be fitted to a number of different vehicles, it is not unknown for different vehicle manufacturers to require different mounting flanges on their wheel cylinders and even for single vehicle manufacturers to have differing mounting flange requirements from vehicle to vehicle.

Wheel cylinder bodies are generally produced as basic castings which are then machined to provide the final wheel cylinder body shape. Because of the differing requirements, particularly with reference to the mounting flange, the basic castings have different shapes and therefore require different jigs for holding the castings during the machining processes Also different jigs may be required for different machining processes. Thus the manufacture of a range of wheel cylinders for a large number off different vehicles will require the use off a large number of different jigs.

This is both expensive and complicated to administer since each jig and casting must arrive at the particular machining process station as matched pairs.

The same production problems also apply to other hydraulic actuators such as clutch and brake master cylinder.

It is an object of the present invention to provide a method of manufacturing an hydraulic actuator body which mitigates the above described production problems.

Thus according to the present invention there is provided a method of manufacturing an hydraulic actuator body characterised by comprising the steps of forming a basic actuator body having a spigot projecting externally therefrom, holding the body by said spigot, and machining the body whilst it is held by the spigot.

The invention also provides a method of manufacturing a wheel cylinder for a drum brake characterised by comprising the steps of forming a basic wheel cylinder body having a flange formed integrally therewith for attachment to a support and a spigot projecting externally away from the body on a side remote from said flange, holding the wheel cylinder body by said spigot, machining the body, and thereafter removing said spigot from the body.

The invention also provides a method of manufacturing a master cylinder body characterised by comprising the steps of forming a basic master cylinder body having a flange formed integrally therewith for attachment to a support and a pair of axially spaced spigots projecting from said basic body, holding the body by said spigots and machining the body whilst it is held by the spigots.

The invention further provides a basic actuator body for use in any of the above described methods, said body being characterised by the provision of one or more holding spigots projecting therefrom.

There is also provided an hydraulic actuator body manufactured by any one of the above described methods.

The invention will now be described, by way of example only, with reference to the accompanying drawings in which.

Figure 1:
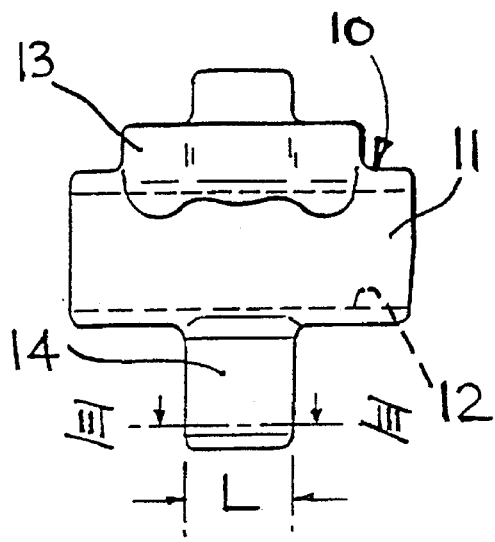
FIG. 1 is a side elevation of a basic casting for the manufacture of a drum brake slave cylinder body using the method of the present invention.
Figure 2:
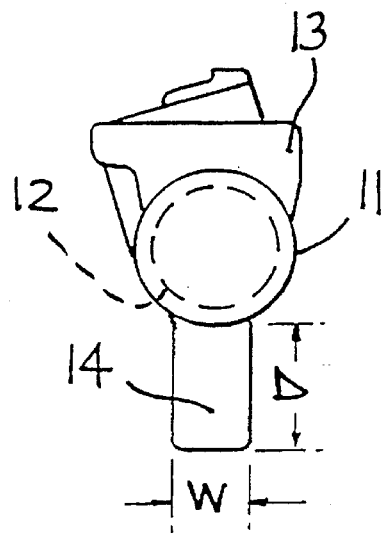
FIG. 2 is an end view of the casting in FIG. 1.
Figure 3:
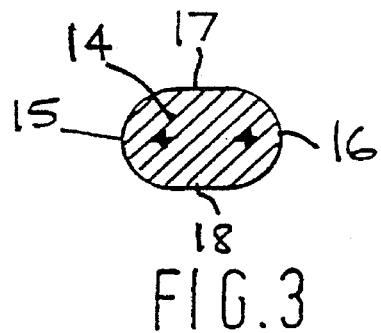
FIG. 3 is a section on the line III—III of FIG. 1.

With reference to FIGS. 1 to 3, there is illustrated a basic casting 10 from which a double-ended wheel cylinder for a motor vehicle internal shoe drum brake will be machined. The casting is typically formed from aluminium or cast iron.

Figure 5:
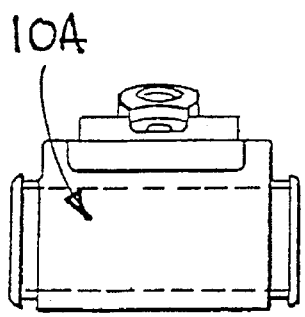
FIGS. 5 and 6 show a machined wheel cylinder body in a finished condition.
Figure 6:
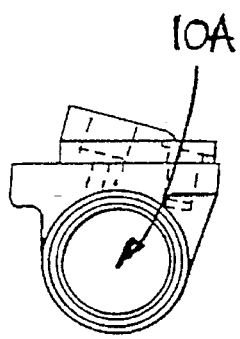
Figure 7:
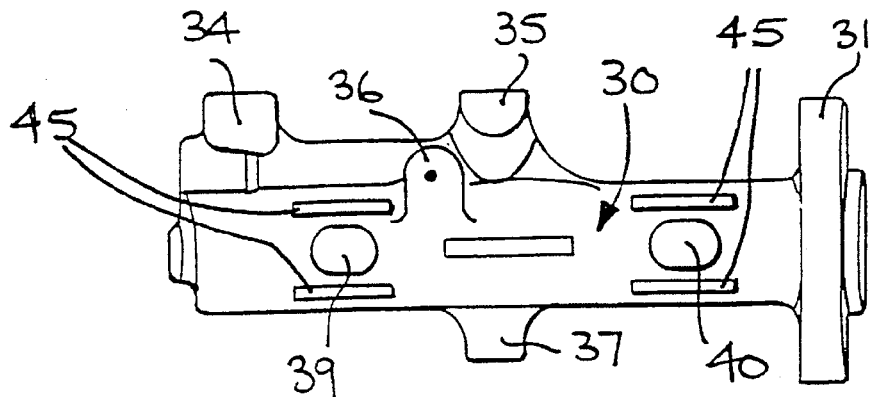
FIG. 7 is an under plan view of a basic master cylinder casting prior to machining by the method of the present invention.
Figure 8:
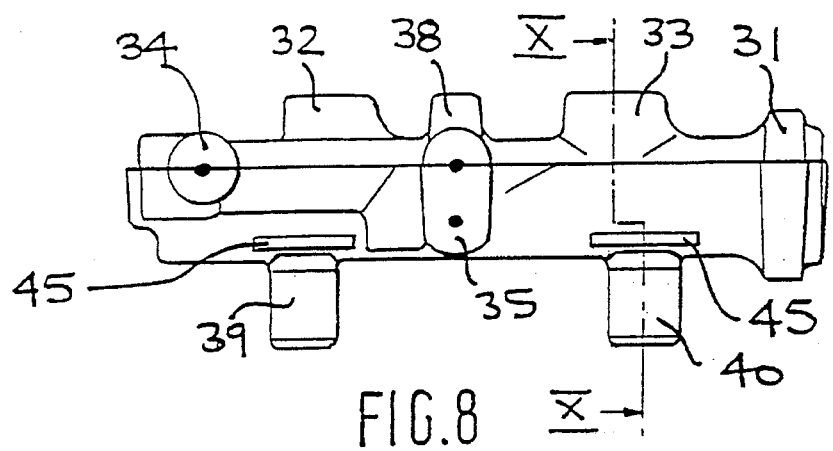
FIGS. 8 and 9 are side and end views respectively of the casting of FIG. 7.
Figure 9:
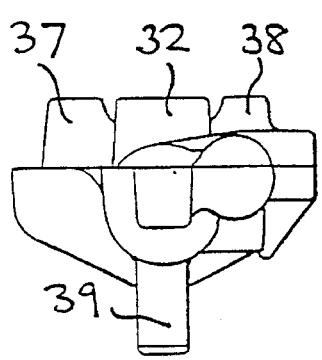
Figure 10:
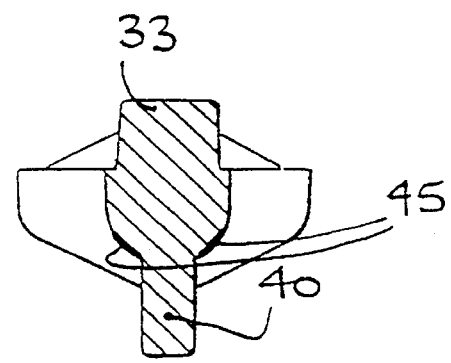
FIG. 10 is a transverse section on line X—X of FIG. 8.

The casting 10 comprises an actuator body 11, which will have a bore 12 (see dotted line) machined therein, with a flange 13 on the side of the body. The casting 10 is intended to be machined to the form 10A shown in FIGS. 5 and 6. The flange 13 after machining is utilised for mounting the wheel cylinder on a back plate of a drum brake. The casting is formed with an integral spigot 14 on its side remote from the flange 13. In use the spigot 14 is gripped between a pair of opposed jaws 21–22 during the machining of the casting to the finished form 10A.

Figure 4:
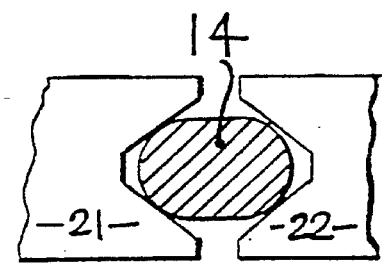
FIG. 4 is a schematic drawing showing a spigot of the casting of FIG. 1 gripped between two opposed jaws.

The spigot 14 preferably has a cross-section as shown in FIG. 3, which is in the form of an elongated circle, that is semi-circular end surfaces 15 and 16 connected by opposite straight sides 17, 18. This shape is considered to give the optimum grip when located in two opposed "V" shaped holding jaws 21 and 22 (see FIG. 4).

The spigot 14 has an overall length "L" of at least 15 mm and more preferably a Length in the range 20–25 mm. The overall width "W" of the spigot 14 is at least 10 mm and preferably of the order of 12–14 mm, and the spigot projects a distance "D" from the body 11 of at least 10 mm and preferably for a distance in the range of 20–25 mm.

The spigot 14 is machined from the casting body 11 after all the other machining operations have been completed.

The advantage of using a spigot 14 for holding the wheel cylinder casting during machining, is that a single design of spigot can be used for holding a variety of different wheel cylinder coatings for a range of different machining operations, thus reducing the variety of holding jaws required for machining different wheel cylinder bodies.

Referring to FIGS. 7 to 11 these show a brake master cylinder basic casting 30 from which a tandem master cylinder will be machined. The casting is again typically formed from aluminium or cast iron.

The casting 30 has a mounting flange 31, bosses 32 and 33 which will serve after machining as reservoir inlets, boss which will provide a rear brake outlet, boss 35 which will provide outlets for left and right front brakes, boss 36 which will provide a pressure failure warning switch port, and bosses 37 and 38 which will serve as supports for the reservoir (not shown).

In addition to carrying out machining operations on the above bosses and other external portions of the casting such as the mounting flange, casting 10 will also be machined internally to provide the usual internal chambers and interconnecting bores conventionally required in a brake master cylinder.

Figure 11:
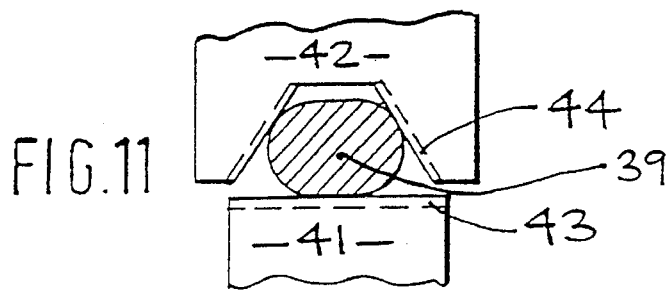
FIG. 11 is a schematic drawing showing a spigot of the casting of FIG. 7 gripped between two opposed jaws.

In order to support the casting during these machining operations the casting is provided with two spigots 39 and 40 which are designed to be gripped by two pairs of jaws 41, 42 which are serrated at 43 and 44 respectively as shogun in FIG. 11. Casting 30 also has locating surfaces 45 positioned either side of each spigot which rest on complementarily shaped portions of jaws 41, 42 during machining.

As shown in FIG. 11, the cross-section of the spigots 39 and 40 is in the same elongated circle described earlier with reference to FIG. 3.

After all other machining operations have been completed the spigots 39, 40 may be machined from the casting. Alternatively, if space considerations allow, the spigots may be left on the master cylinder casting. It may, in certain circumstances, be possible to use one or both of the spigots to mount the finished master cylinder in its operational position on a vehicle.

As with the wheel cylinder body described above the advantage in using spigots 39, 40 to hold the master cylinder during machining is that a single spigot design (which is also conveniently the same at the spigot design used for wheel cylinders) can be used for holding a wide variety of master cylinder castings, thus reducing the variety of holding jaws required for machining different actuators.

I claim:

1. A method of manufacturing a hydraulic actuator comprising the steps of:
    a) providing a casting mould contoured to produce a basic actuator body including an integrally formed gripping spigot projecting therefrom, and locating surfaces on opposite sides of the gripping spigot;
    b) casting the basic actuator body in the mould;
    c) removing the basic actuator body from the mould;
    d) inserting said gripping spigot of said basic actuator body between a cooperative pair of jaws in a machining jig, and gripping said gripping spigot with said cooperative jaws such that said locating surfaces rest against said jaws;
    e) machining the body while gripped in the jig to form a completed hydraulic actuator; and
    f) removing said gripping spigot from said hydraulic actuator.

2. A method according to claim 1 wherein the basic actuator body is cast with two axially spaced gripping spigots projecting therefrom, with locating surfaces on opposite sides of each spigot, in a correspondingly contoured mould, and the gripping spigots of the basic actuator body are gripped in the jig by respective pairs of cooperative jaws such that said locating surfaces rest against said jaws during machining.

3. A basic actuator body from which a hydraulic actuator can be manufactured in a machining operation, said basic actuator body comprising a casting with an integrally formed gripping spigot projecting therefrom, and locating surfaces on opposite sides of said gripping spigot, whereby the casting can be gripped in a machining jig between a pair of cooperative jaws, with the locating surfaces resting against said cooperative jaws, during said machining operation.

4. A body according to claim 3 wherein the gripping spigot is substantially in the form of an elongated circle having a pair of opposed straight sides.

5. A body according to claim 3 wherein the gripping spigot has an overall length between 15 and 25 mm.

6. A body according to claim 3 wherein the overall width of the gripping spigot is between 10 and 14 mm.

7. A body according to claim 3 wherein the gripping spigot projects from the casting for a distance between 10 and 25 mm.

8. A body according to claim 3 wherein the casting includes two axially spaced gripping spigots projecting therefrom, with locating surfaces on opposite sides of each spigot, whereby the gripping spigots can be gripped in the jig by respective pairs of cooperative jaws such that said locating surfaces rest against said jaws during machining.

* * * * *